United States Patent
Hsu et al.

(10) Patent No.: US 7,443,857 B1
(45) Date of Patent: Oct. 28, 2008

(54) CONNECTION ROUTING BASED ON LINK UTILIZATION

(75) Inventors: Shawn Hsu, Fremont, CA (US); Rachel Yiwen Chen, San Jose, CA (US); Mana Palai, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 1023 days.

(21) Appl. No.: 10/616,613

(22) Filed: Jul. 9, 2003

(51) Int. Cl.
*H04L 12/56* (2006.01)

(52) U.S. Cl. .................................... 370/395.1; 709/225

(58) Field of Classification Search ................ 370/395, 370/238
See application file for complete search history.

(56) References Cited

U.S. PATENT DOCUMENTS

| | | | |
|---|---|---|---|
| 5,533,009 A * | 7/1996 | Chen | 370/232 |
| 5,953,338 A * | 9/1999 | Ma et al. | 370/395.21 |
| 6,272,139 B1 * | 8/2001 | Soncodi | 370/241.1 |
| 6,400,681 B1 | 6/2002 | Bertin et al. | |
| 6,456,600 B1 | 9/2002 | Rochberger et al. | |
| 6,560,242 B1 * | 5/2003 | Hamedani et al. | 370/467 |
| 6,654,701 B2 | 11/2003 | Hatley | |
| 6,697,333 B1 * | 2/2004 | Bawa et al. | 370/238 |
| 6,714,544 B1 * | 3/2004 | Bosloy et al. | 370/395.1 |
| 6,741,585 B1 | 5/2004 | Munoz et al. | |
| 6,778,495 B1 | 8/2004 | Blair | |
| 6,836,464 B2 * | 12/2004 | Igarashi et al. | 370/238 |
| 6,922,409 B1 * | 7/2005 | Medhat et al. | 370/395.2 |
| 6,934,249 B1 | 8/2005 | Bertin et al. | |
| 2002/0009088 A1 * | 1/2002 | Donaghey et al. | 370/397 |
| 2003/0081608 A1 | 5/2003 | Barri et al. | |
| 2003/0118025 A1 * | 6/2003 | Lee | 370/395.1 |

OTHER PUBLICATIONS

The ATM Forum Tecnical Committe, "PNNI Addendum for Generic Application Transport, Version 1.0", Jul. 1999.*
The ATM Forum, Private Network-Network Interface Specification Version 1.1 (PNNI 1.1), Apr. 2002, http://www.ipmplsforum.org/ftp/pub/approved-specs/af-pnni-0055.001.pdf.

* cited by examiner

*Primary Examiner*—Chirag G Shah
*Assistant Examiner*—Salvador E Rivas
(74) *Attorney, Agent, or Firm*—Stolowitz Ford Cowger LLP

(57) ABSTRACT

A method and system for connection routing based on link utilization. A link utilization limit is accessed at a node of a network. The link utilization limit is compared to a utilization of a link coupled to the node. If the utilization of the link is greater than the link utilization limit, then the link is excluded from a virtual circuit.

23 Claims, 3 Drawing Sheets

CONNECTION ROUTING BASED ON LINK UTILIZATION

FIELD OF THE INVENTION

Embodiments of the present invention relate to Asynchronous Transfer Mode networking. More particularly, embodiments of the present invention provide a method and system for connection grooming based on link utilization.

BACKGROUND

Asynchronous Transfer Mode (ATM) is a leading networking technology for a wide variety of networking needs. ATM protocols are designed to handle isochronous (time critical) data such as video and telephony, in addition to more conventional data communications between computers or other networks. ATM is a 'connection oriented' technology. Prior to any data transfer over an ATM network, a connection (permanent or switched) is established which satisfies the required data transfer quality of service (QOS), e.g., available bandwidth. Such connections are frequently referred to as "calls."

ATM is particularly well suited to support virtual networking due to its connection oriented nature. A capability to establish a private network between any end systems provides physical location independence and privacy. Location independence means that end users can be put on the same virtual local area network (LAN) independently of their physical location. The Private Network to Network Interface (PNNI) protocol, commercially available from the ATM Forum of San Francisco, Calif., is generally used to establish virtual connections across an ATM network.

A large ATM network is generally set up as a hierarchy of sets of smaller networks frequently referred to as "peer groups." For example, a low level peer group can comprise network nodes in a single metropolitan area. A higher level network abstraction can comprise all such clusters as well as links between such clusters.

The term "routing" within ATM networks is generally understood to refer to or to describe a process of locating a target end system and selecting the best possible path to reach the target. This function is similar to the routing provided by internet protocol (IP) networks. However, ATM routing has been extended to support two major requirements generally not available in IP networks, quality of service (QOS) routing and scalability. Quality of service routing supports classical data applications and real time applications such as videoconferencing on the same physical infrastructure. Scalability supports very small networks of few switches up to world wide networks of thousands switches using a single protocol. Signaling is required due to the 'connection oriented' nature of ATM technology. When setting up (tearing down) a connection, each switch on the selected path needs to allocate (release) the resources required to satisfy the QOS requirement of the connection. One such signaling message is the "setup" message, which is used to initiate a connection.

A virtual connection is often referred to as a Smart (or Soft) Permanent Virtual Circuit (SPVC). SPVC is generally understood to refer to or to describe a communications or communications medium which is "permanently" (for the life of the circuit) provisioned at the end points, but switched in the middle. An SPVC generally connects "point A" to "point B." However, the actual routing path on the physical network is generally unknown to the user. Such virtual circuits are usually long-lived, e.g., the life of such circuits is of the order of months.

Due to changing conditions on the underlying physical network, the best routing for a particular connection (virtual circuit) may change over time. For example, assume that a direct path exists from point A to point B. However, if there is insufficient capacity available on that link for a new connection, the new connection can be routed from point A to point B via point C. At some later time, for example because of decreased usage of the direct path from point A to point B, sufficient capacity for the connection becomes available on the direct path from point A to point B. A process known as connection "grooming" (also known as "route optimization") periodically, e.g., once per day, can examine and optimize the path of a connection. If a routing change is to be made, generally a new route is established prior to tearing down the prior path. This is generally known as "soft" rerouting, and can utilize a "soft setup" signal or message.

During a connection grooming process, it is desirable to choose links that have the lowest "cost" for a connection. Many factors can be considered in determining a cost, including latency and delay for a link. Due to route optimization at call setup (initialization) and during grooming, low cost links tend to fill up, e.g., reach capacity. Since the capacity of a virtual circuit is allocated to that virtual circuit, a call tends to stay on the best, or lowest cost, link. As an unfortunate consequence, the "best" links are typically unavailable for new calls once the bandwidth for these links has been allocated to existing calls. In addition, any excess capacity is concentrated in the "worst" links. Therefore, an interruption to the "best" links, e.g., a fault in such links, can cause virtual circuits to be rerouted from the "best" links to the "worst" links, which can have unacceptable quality of service.

Accordingly, it is desirable to route a virtual circuit according to the utilization of a link. A further desire exists for communicating a link utilization factor through the links of a network. A still further desire exists for the above mentioned capabilities to be achieved with a scalable and cross-platform architecture that is compatible with industry standards.

SUMMARY OF THE INVENTION

Embodiments in accordance with the present invention route a virtual circuit according to the utilization of a link. Further embodiments in accordance with the present invention communicate a link utilization limit through the links of a network. Still further embodiments in accordance with the present invention achieve the above mentioned capabilities with a scalable and cross-platform architecture that is compatible with industry standards.

A method and system for connection routing based on link utilization are disclosed. A link utilization limit is accessed at a node of a network. The link utilization limit is compared to a utilization of a link coupled to the node. If the utilization of the link is greater than the link utilization limit, then the link is excluded from a virtual circuit.

DETAILED DESCRIPTION OF THE INVENTION

In the following detailed description of the present invention, connection routing based on link utilization, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow (e.g., process 200) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "comparing" or "processing" or "computing" or "translating" or "calculating" or "determining" or "excluding" or "displaying" or "recognizing" or "generating" or "assigning" or "initiating" or "collecting" or "transferring" or "switching" or "accessing" or "retrieving" or "receiving" or "issuing" or "measuring" or "conveying" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

CONNECTION ROUTING BASED ON LINK UTILIZATION

Figure 1:
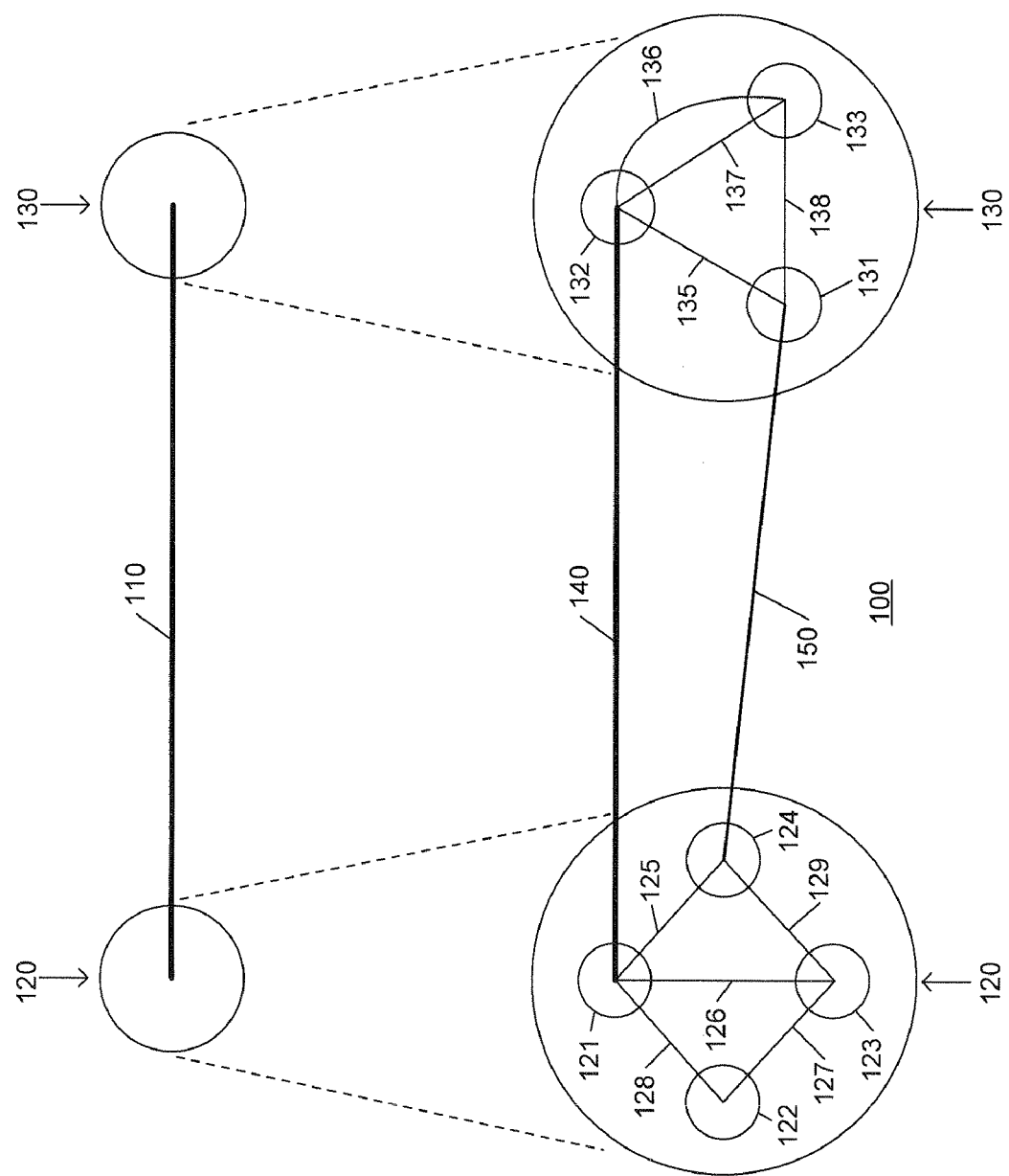
FIG. 1 illustrates a block diagram of an exemplary network, upon which embodiments of the present invention can be implemented.

FIG. 1 illustrates a block diagram of an exemplary network 100, upon which embodiments of the present invention can be implemented. It is to be appreciated that embodiments in accordance with the present invention are well suited to a wide variety of network topologies. The circles of FIG. 1 represent nodes of network 100 and the solid lines represent links between the nodes indicated. Peer group 120 comprises nodes 121, 122, 123 and 124. Peer group 130 comprises nodes 131, 132 and 133. Link 110 represents the coupling between peer groups 120 and 130. In actuality, peer group 120 is coupled to peer group 130 by links 140 and 150. Links 140 and 150 can also be sometimes known as trunk links, or trunks.

Within peer group 120 there are links coupling the various nodes of the peer group. Link 125 couples node 121 with node 124. Link 126 couples node 121 with node 123. Link 127 couples node 123 with node 122. Link 128 couples node 121 with node 122. Similarly, there are links that couple the various nodes of peer group 130. Links 136 and 137 couple node 132 with node 133. Link 138 couples node 131 with node 133. Link 135 couples node 131 with node 132.

In general, each link of network 100 can have a different information carrying capacity and cost associated with carrying information. The cost of carrying information can comprise many factors, for example, the transmission delay associated with the link. Network routing generally attempts to determine a least costly routing to establish a virtual circuit.

Utilization of a link generally refers to an amount of information carried by a link relative to the link's maximum capacity. Link utilization can also refer to an amount of a link's information capacity that has been reserved, e.g., for virtual circuit connections, relative to the link's maximum capacity.

Assuming available bandwidth, the best route from node 121 to node 133 can be from node 121 over link 140 to node 132 and then over link 137 to node 133. However, in some cases it is desirable to keep the utilization of a link below a pre-determined maximum value. For example, keeping a link utilization below a pre-determined maximum value can allow greater network flexibility in responding to the creation of new virtual circuit connections and/or in response to equipment or linkage disruptions.

The utilization of a link can generally be known only for nodes within a common peer group. For example, node 132 can determine the utilization of link 138, for example by inquiring this information of node 131, but node 121 can not determine the utilization of link 138. Consequently, the initiating node of a virtual circuit connection can not generally control or determine whether a routing of the virtual circuit connection comprises a link exceeding a pre-determined maximum utilization.

In accordance with embodiments of the present invention, a "link utilization limit" can be specified as part of the setup message that begins routing of a virtual circuit connection. A link utilization limit generally specifies a maximum desired utilization, e.g., as a percentage of a link's maximum information carrying capacity, of a link that will be included as part of a virtual circuit connection. A link utilization limit can specify a maximum desired utilization for a link prior to, or including the required information capacity of the virtual circuit connection.

It is to be appreciated that the term "link utilization limit" as used herein does not, in general, refer to the maximum information carrying capacity of a link. The maximum information carrying capacity of a link is a property of a specific link. It is substantially static, generally changing only when fundamental characteristics of a link change, for example, if the physical media of the link is changed. In contrast, a link utilization limit can be a property of a specific virtual circuit. In general it can be different for different virtual circuits, independent of the physical links that form such circuits. A link utilization limit as used herein is typically less than the maximum information carrying capacity of a link. It is however to be appreciated that a link utilization limit can be numerically equal to maximum information carrying capacity of a link in accordance with embodiments of the present invention.

By indicating a requirement that a particular virtual circuit connection not be routed over links exceeding the specified link utilization limit, nodes along an attempted path can determine if a particular link meets the specified link utilization limit, and consequently if that particular link is available for the virtual circuit connection.

For example, an initiator of a virtual circuit connection can determine that it is desirable to use only links at or below 75 percent of such links' maximum capacity in the virtual circuit connection. The 75 percent limit can include capacity for the virtual circuit connection. Alternatively, the 75 percent limit can be applied to the condition of a link prior to accounting for additional bandwidth of the virtual circuit connection.

In accordance with embodiments of the present invention, such a link utilization limit can be included in setup message(s) in a variety of ways. One exemplary method is to embed a link utilization limit within the Generic Application Transport Information Element in a setup message. The Generic Application Transport Information Element is defined by the ATM standards and can be forwarded undamaged through nodes that do not support a link utilization limit.

It is to be appreciated that it is possible that a virtual circuit connection can not be established due to such a link utilization limit. For example, there can be sufficient information capacity on links required to establish a virtual circuit connection. However, one or more of those links can be utilized in excess of the desired link utilization limit. In such a case, in accordance with embodiments of the present invention, a virtual circuit connection originator can decide if it is more desirable to establish the circuit or to enforce the desired link utilization limit. If it is desired to establish the circuit, a link utilization limit can be omitted from the setup message(s). Alternatively, a link utilization limit can be set to 100 percent, allowing any link with remaining information capacity sufficient for the circuit to be utilized.

In accordance with another embodiment of the present invention, a link utilization limit can be enforced during connection grooming. Connection grooming (or route optimization) is performed periodically once a connection is established. During connection grooming, a new route utilizing only links with less capacity utilization than a specified link utilization limit can be attempted. If such a routing is successful, then the virtual circuit connection can utilize the new route. Generally, the "cost" of the new route in relation to the cost of the existing route is also considered in a decision to change routing.

In accordance with yet another embodiment of the present invention, link utilization can be included in a calculation of the "cost" of routing a virtual circuit connection. For example, in addition to calculating a routing cost comprising terms such as latency of a link, transmission time, number of packets queued for transmission over a link and the like, link utilization can be included in such a routing cost calculation so as to generally increase a link cost for highly utilized links and/or lower a link cost for less utilized links. It is to be appreciated that there are many ways of including link utilization in a routing cost calculation that are well suited to embodiments in accordance with the present invention.

In accordance with embodiments of the present invention, a routing cost comprising link utilization information can be calculated as follows:

$$\text{Link Cost(utilization)} = \text{link cost} * w * \text{utilization} \quad \text{(relation 1)}$$

Where "Link Cost(utilization)" is a link cost comprising link utilization information, "link cost" is a link cost that does not include link utilization, "w" is a weighting factor, and "utilization" is a ratio of actual utilization of a link to that link's information capacity. Relation 1 generally reduces the utilization-based link cost for links with a low utilization, beneficially favoring such links in routing.

Embodiments in accordance with the present invention are well suited to routing using a combination of utilization-based routing cost and a link utilization limit. For example, a virtual circuit connection can be routed (or a routing attempted) based on a lowest cost routing, where link utilization is considered in the cost computation. The routing can still be subject to an absolute link utilization limit. In this novel manner, low utilization links can be favored in routing a virtual circuit that does not comprise links utilized above a desired link utilization limit.

Figure 2:
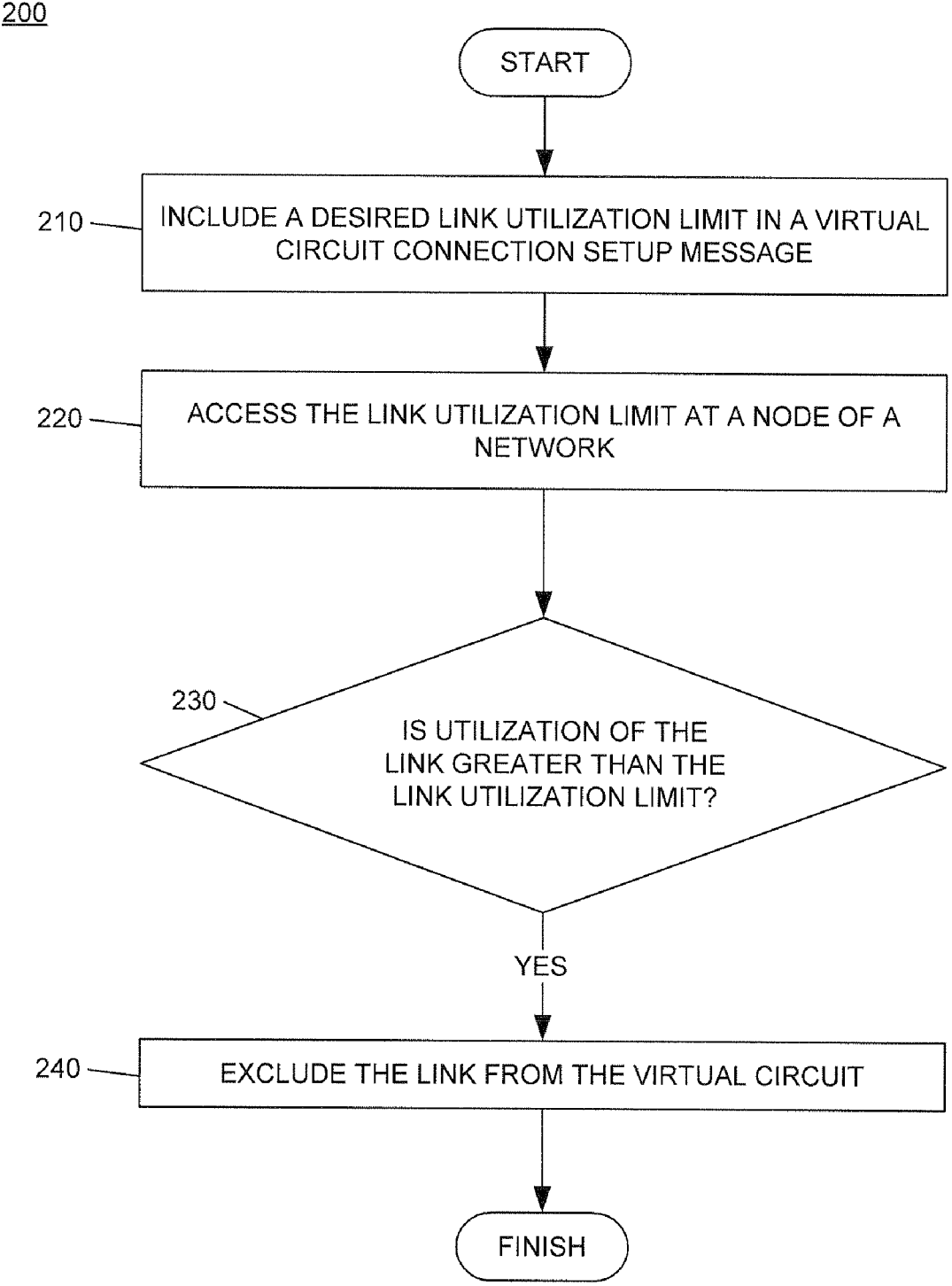
FIG. 2 illustrates a flow chart for a method, in accordance with embodiments of the present invention.

FIG. 2 illustrates a flow chart for a method 200, in accordance with embodiments of the present invention. In block 210, a desired link utilization limit is included in a virtual circuit connection setup message. The link utilization limit indicates a maximum utilization for links to be used for the virtual circuit connection.

In block 220, the link utilization limit is accessed by a node of a network. In block 230, the link utilization limit is compared to the utilization of a link coupled to the node. The comparison of the link utilization limit can be to a current utilization of the link. Alternatively, the link utilization limit can be to a current utilization of the link plus an additional bandwidth required for the virtual circuit connection.

Responsive to the comparison of block 230, if utilization of the link is greater than the link utilization limit, in block 240 the link is not used for the virtual circuit connection.

Referring once again to FIG. 1, to setup an exemplary virtual circuit from node 121 to node 133, a setup message can include a link utilization limit of 75 percent (block 210 of FIG. 2). In accordance with embodiments of the present invention, a link utilization limit can be used by nodes of a network to limit inclusion of links having a utilization of greater than the link utilization limit from a virtual circuit. One possible routing of such a virtual circuit is via links 140 and 137.

In accordance with block 220 of FIG. 2, node 121 can access the link utilization limit of the setup message. In block 230 of FIG. 2, the link utilization limit can be compared to the utilization of link 140. Assuming that link 140 has a utilization of 80 percent, it will not be used in the present routing of the virtual circuit.

The virtual circuit can be routed, for example, via link 125 to node 124, and then via link 150 to node 131, and then via link 138 to node 133, presuming that none of links 125, 150 nor 138 have a link utilization of 75 percent or greater.

Figure 3:
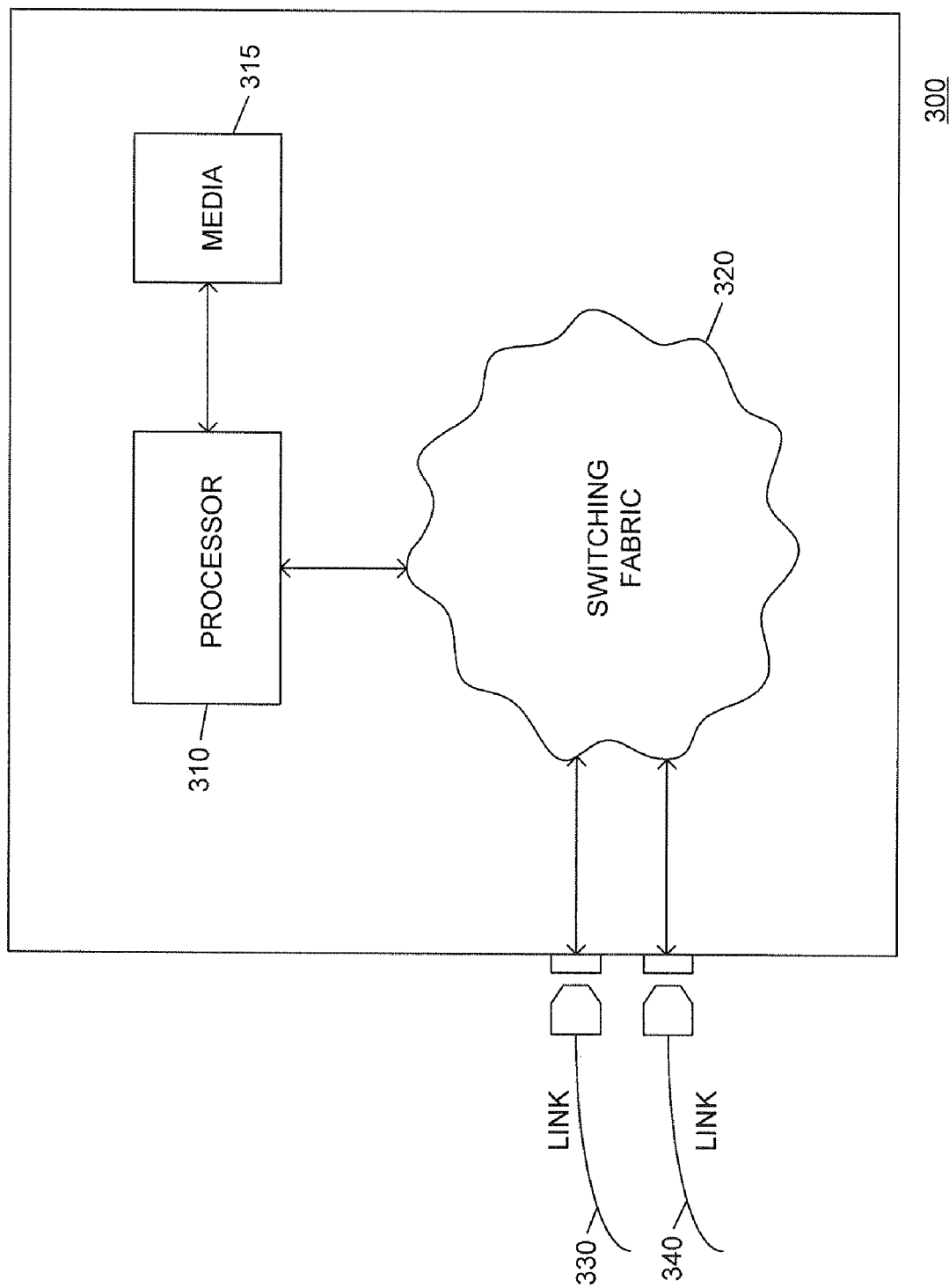
FIG. 3 illustrates a network switch apparatus, in accordance with embodiments of the present invention.

FIG. 3 illustrates a network switch apparatus 300, in accordance with embodiments of the present invention. Network switch apparatus 300 comprises a processor 310, computer usable media 315 and switching fabric 320. Computer usable media 315 can comprise a variety of types of computer readable memory, e.g., read only memory (ROM), flash electrically erasable read only memory ("flash"), or random access memory (RAM) and the like. A plurality of links, e.g., links 330 and 340, can be coupled to network switch apparatus 300. Links 330 and/or 340 can be a variety of network links, e.g., T3, E3, single or multi-mode optical fiber, coaxial cable and the like.

The general operation of network switch apparatus 300 is to receive a communication, e.g., a packet, on one of a plurality of links and to switch the communication to another of the links. The switching can be based upon characteristics of the communication, e.g., an address within a packet, or the switch can be configured to direct information from one link to another link in a generally static configuration. Processor 310 can play a role in switching the information among the links, however processor 310 is generally used to control switching fabric 320 and switching fabric 320 performs substantially all of the information switching function.

In accordance with embodiments of the present invention, computer usable media 315 can comprise computer-readable program code to be executed by processor 310. Processor 310 can interpret a setup message requesting the initialization of a virtual circuit connection. If the setup message comprises a link utilization limit, processor 310 can compare the link utilization limit to a utilization of a link coupled to the network switch apparatus 300. If the utilization of the link is greater than the link utilization limit, then network switch apparatus 300 will not use the link for the virtual circuit connection.

For example, if a setup message is accessed from link 340 comprising a link utilization limit of 75 percent, link 330 will not be used in the virtual circuit connection if link 330 has a link utilization of 80 percent.

Embodiments in accordance with the present invention route a virtual circuit according to the utilization of a link. Further embodiments in accordance with the present invention communicate a link utilization limit through the links of a network. Still further embodiments in accordance with the present invention achieve the above mentioned capabilities with a scalable and cross-platform architecture that is compatible with industry standards.

Embodiments in accordance with the present invention, connection routing based on link utilization, are thus described. While the present invention has been described in particular embodiments, it should be appreciated that the present invention should not be construed as limited by such embodiments, but rather construed according to the below claims.

What is claimed is:

1. An apparatus, comprising:
control circuitry; and
a memory coupled to the control circuitry comprising instructions executable by the control circuitry, the control circuitry operable when executing the instructions to:
exchange local peer group topology information updates with local nodes the local nodes contained within a local peer group of the apparatus and connected to the apparatus independently of any trunk links, the local peer group topology information updates exchanged over at least one local peer group horizontal link and independently of any trunk links;
receive, over at least one trunk link that connects the local peer group to a remote peer group, a call setup signaling message sent by a remote originating node, the call setup signal message to initiate routing of a virtual circuit connection;
inspect a predefined portion of the call setup signaling message for information formatted as one or more Asynchronous Transfer Mode (ATM) Generic Application Transport Information Elements (GATIE), and if such information is present, analyze the present ATM GATIEs for a link utilization threshold value;
generate a dynamic local peer group horizontal link utilization value of the local peer group horizontal link based at least in part on the local peer group topology information updates, the generated dynamic local peer group horizontal link utilization value corresponding to a current utilization of the local peer group horizontal link;

compare the dynamic local peer group horizontal link utilization value with the link utilization threshold value;
determine whether the dynamic local peer group horizontal link utilization value exceeds the link utilization threshold value according to the comparison; and
control whether the local peer group horizontal link is included in the virtual circuit connection according to said determination;
wherein the remote peer group is logically segmented from the local peer group the remote peer group maintaining network topology information independently of the local peer group topology information updates.

2. The apparatus of claim 1 wherein the control circuitry is further operable to:
identify a ratio of actual utilization of the local peer group horizontal link to a local peer group horizontal link utilization capacity;
generate link utilization cost information by, at least in part, multiplying the ratio by a cost indicator associated with the local peer group horizontal link; and
determine whether the local peer group horizontal link is included in the virtual circuit connection according to the generated link utilization cost information.

3. The apparatus of claim 1 wherein the apparatus is a conduit for the remote originating node to influence routing decisions through the local peer group based on local peer group topology information via the call setup signaling message.

4. A method comprising:
generating a signaling message in a local sending node of a local peer group to initiate routing of a virtual circuit connection through a remote peer group, the remote peer group comprising a remote receiving node;
wherein the local sending node is operable to synchronize local peer group routing information with other local peer group nodes, the local peer group nodes and the local sending node identifiable as members of the local peer group by a local peer group identifier;
wherein the remote receiving node is operable to synchronize remote peer group routing information with other remote peer group nodes, the remote peer group nodes and the remote receiving node identifiable as members of the remote peer group by a remote peer group identifier;
generating an information element having a predefined format, the information element representing a link utilization threshold value; and
formatting the generated signaling message to contain the information element, the presence of the information element in the predefined format to trigger the remote receiving node located in the remote peer group to:
use the link utilization threshold value to determine whether a remote peer group horizontal link utilization exceeds the link utilization threshold value based on the synchronized remote peer group routing information; and
select the remote peer group horizontal link for including in the virtual circuit connection according to the determination.

5. The method of claim 4 wherein the signaling message is sent using Private Network to Network Interface (PNNI) protocol wherein the predefined format is a Generic Application Transport Information Element (GATIE) format.

6. The method of claim 5 further comprising sending a soft rerouting message after the virtual circuit connection is established, the soft rerouting message including the same or a different link utilization threshold value formatted using the GATIE format.

7. The method of claim 6 wherein the soft rerouting message elicits formation of a new path prior to tear down of an existing path for the virtual circuit connection.

8. The method of claim 7 wherein the new path retains terminating nodes of the virtual circuit connection but excludes at least one midpoint node belonging to the existing path.

9. An apparatus, comprising:
control circuitry; and
a memory coupled to the control circuitry comprising instructions executable by the control circuitry, the control circuitry operable when executing the instructions to:
identify whether a target link is a local peer group horizontal link contained within a local peer group of the apparatus, wherein the apparatus is associated with the local peer group comprising one or more local nodes and wherein the apparatus is operable to receive local peer group horizontal link utilization information flooded from other local peer group nodes via the local peer group horizontal link;
if the target link is local;
  inquire within the local peer group for current local peer group horizontal link utilization information; and
  directly control inclusion of the target link in a virtual circuit connection according to the local peer group horizontal link utilization information;
identify whether the target link is a remote peer group horizontal link contained within a remote peer group, wherein the remote peer group comprises a remote receiving node operable to receive remote peer group horizontal link utilization information flooded from other remote peer group nodes via a remote peer group horizontal link;
if the target link is remote;
  generate a call setup signaling message to initiate routing of the virtual circuit connection; and
  insert a link utilization limit into a predefined location within the call setup signaling message, the presence of the link utilization limit in the predefined location to trigger the remote receiving node to control inclusion of the remote target link in the virtual circuit connection according to the link utilization limit.

10. The apparatus of claim 9 wherein the control circuitry is further operable to format the link utilization limit as an ATM Generic Application Transport Information Element (GATIE) included in the call setup signaling message, the formatting of the link utilization limit as an ATM GATIE to cause remote devices inspecting the ATM GATIE to observe the link utilization limit and control link inclusion responsive to the observation.

11. The apparatus of claim 10 wherein the formatting of the link utilization limit as the ATM GATIE provides undisrupted forwarding of the call setup signaling message through remote devices that do not support controlling link inclusion according to the link utilization limit.

12. The apparatus of claim 11 wherein the call setup signaling message is transferred over a trunk link that couples the local peer group of the apparatus to the remote peer group.

13. The apparatus of claim 12 wherein the call setup signaling message allows the apparatus to remotely control inclusion of links outside the local peer group of the apparatus independently of whether the apparatus is provided with messages indicating the utilization of the remote peer group horizontal links.

14. A method, comprising:
receiving a call setup signaling message at a receiving node of a local peer group wherein the local peer group comprises one or more local nodes and the call setup signaling message is sent via a trunk link by a remote originating node of a remote peer group to initiate routing of a virtual circuit connection;
receiving topology information at the receiving node corresponding to one or more horizontal links of the local peer group wherein the topology information is sent from local nodes of the local peer group nodes identified as local peer group members via a peer group identifier;
observing an ATM GATIE included in the call setup signaling message, and responsive to observing the ATM GATIE, analyzing the ATM GATIE for a link utilization threshold value;
generating a dynamic link utilization value for a horizontal link contained within the local peer group based at least in part on the topology information;
comparing the dynamic link utilization value with the link utilization threshold value;
determining whether the dynamic link utilization value corresponds to the link utilization threshold value; and
controlling whether the horizontal link is included in the virtual circuit connection according to said determination.

15. The method of claim 14 wherein the dynamic link utilization value of the horizontal link corresponds to an amount of capacity that has been reserved on the horizontal link.

16. The method of claim 14 wherein the dynamic link utilization value of the horizontal local link corresponds to an amount of capacity that is actually being used on the horizontal link.

17. The method of claim 14 further comprising:
identifying a ratio of actual utilization of the link to the link utilization threshold value;
generating link utilization cost information by, at least in part, multiplying the ratio by a cost indication associated with the horizontal link; and
determining whether the horizontal link is included in the virtual circuit connection according to the generated link cost information.

18. A system comprising:
means for generating a call setup signaling message to establish a virtual circuit connection extending from an originating node;
means for formatting the call setup signaling message with an opaque information element, the opaque information element representing a link utilization threshold value;
means for sending the call setup signaling message having the opaque information element along a path through a network from the originating node contained in a local peer group to a remote node contained in a remote peer group;
wherein the local peer group comprises one or more local nodes configured to synchronize topology information associated with the local peer group;
wherein the remote peer group comprises one or more remote nodes configured to synchronize topology information associated with the remote peer group;
wherein the opaque information element is sent through both preconfigured remote nodes that are configured to inspect for the opaque information elements and through non-configured remote nodes that are not configured for said inspection;

wherein the opaque information element triggers the pre-configured remote nodes to select between links for the virtual circuit connection according to a comparison of the link utilization threshold value to utilization of the links according to synchronized topology information associated with the remote peer group; and wherein the opaque information element is forwarded unmodified by the non-configured nodes.

19. The system of claim 18 wherein the opaque information element is an ATM GATIE.

20. The system of claim 18 wherein the call setup signaling message is a PNNI protocol setup message.

21. The system of claim 18 further comprising means for selecting between the links based on both the comparison and costs associated with the links.

22. The system of claim 18 wherein the utilization of the links corresponds to an amount of capacity that has been reserved.

23. The system of claim 18 wherein the utilization of the links corresponds to an amount of capacity that is actually being used.

* * * * *

UNITED STATES PATENT AND TRADEMARK OFFICE
CERTIFICATE OF CORRECTION

PATENT NO. : 7,443,857 B1 Page 1 of 1
APPLICATION NO. : 10/616613
DATED : October 28, 2008
INVENTOR(S) : Hsu et al.

It is certified that error appears in the above-identified patent and that said Letters Patent is hereby corrected as shown below:

Title Page;
In bracket 75 (Inventors), please change Mana Palai's citizenship to 'IN' to reflect that which was submitted in the Declaration on July 9, 2003.
At column 7, line 45, please replace "with local nodes the local nodes" with --with local nodes, the local nodes--.
At column 8, line 10, please replace "local peer group the remote peer" with --local peer group, the remote peer--.
At column 9, line 42, please indent the section so that it is aligned with the section beginning at line 40.

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,443,857 B1
APPLICATION NO.   : 10/616613
DATED             : October 28, 2008
INVENTOR(S)       : Shawn Hsu et al.

It is certified that error appears in the above-identified patent and that said Letters Patent is hereby corrected as shown below:

In bracket 56 (References Cited; OTHER PUBLICATIONS), please replace "Tecnical Committe" with --Technical Committee--.
At column 10, claim 16, line 35, please replace "horizontal local link" with --horizontal link--.

Signed and Sealed this

Twenty-ninth Day of June, 2010

David J. Kappos
*Director of the United States Patent and Trademark Office*